US011032106B1

(12) United States Patent
Nautiyal

(10) Patent No.: US 11,032,106 B1
(45) Date of Patent: Jun. 8, 2021

(54) LAYER 2 TUNNEL PROTOCOL ("L2TP") NODE PROCESSING OPTIMIZATION USING A DEDICATED HELLO CHANNEL KEEPALIVE MECHANISM

(71) Applicant: Juniper Networks, Inc., Sunnyvale, CA (US)

(72) Inventor: Yogesh Prakesh Nautiyal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 272 days.

(21) Appl. No.: 16/237,216

(22) Filed: Dec. 31, 2018

Related U.S. Application Data

(60) Provisional application No. 62/742,228, filed on Oct. 5, 2018.

(51) Int. Cl.
*H04L 12/46* (2006.01)
*H04L 29/08* (2006.01)
*H04L 12/26* (2006.01)

(52) U.S. Cl.
CPC ...... *H04L 12/4633* (2013.01); *H04L 43/0811* (2013.01); *H04L 43/10* (2013.01); *H04L 67/142* (2013.01); *H04L 69/324* (2013.01)

(58) Field of Classification Search
CPC ..... H04L 43/10; H04L 43/12; H04L 12/4633; H04L 43/143; H04L 43/145; H04L 43/0811
See application file for complete search history.

(56) References Cited

U.S. PATENT DOCUMENTS

| 10,397,085 | B1 * | 8/2019 | Seth | H04L 43/10 |
| 2006/0072480 | A1 * | 4/2006 | Deval | H04L 45/60 370/254 |
| 2006/0104308 | A1 * | 5/2006 | Pinkerton | H04L 63/0485 370/469 |
| 2009/0287955 | A1 * | 11/2009 | Matsumoto | H04L 12/4633 714/4.1 |
| 2010/0174808 | A1 * | 7/2010 | Dabagh | G06F 1/3203 709/221 |
| 2015/0229724 | A1 * | 8/2015 | Ray | H04L 45/026 370/352 |

(Continued)

FOREIGN PATENT DOCUMENTS

CN 101980476 B * 12/2012

OTHER PUBLICATIONS

W. Townsley, A. Valencia, A. Rubens, G. Pall, G. Zorn , B. Palter, Request for Comments 2661: Layer Two Tunneling Protocol "L2TP", pp. 1-80 (Year: 1999).*

(Continued)

*Primary Examiner* — Christopher M Crutchfield
(74) *Attorney, Agent, or Firm* — John C. Pokotylo; Pokotylo Patent Services

(57) ABSTRACT

A separate dedicated channel is set up and used for tunnel keepalive exchanges. Using such a dedicated channel permits tunnel keepalives to be processed completely at forwarding plane, without needing to send them to the control plane for processing. This dedicated channel can implement its own sequencing (in a way that avoids the need to use the control plane for processing). Alternatively, this dedicated channel might not use sequencing at all.

19 Claims, 13 Drawing Sheets

(56) References Cited

U.S. PATENT DOCUMENTS

2016/0183316 A1* 6/2016 Bi ...................... H04L 41/0806
370/328

OTHER PUBLICATIONS

A. Krywaniuk, T. Kivinen, Using Isakmp Heartbeats for Dead Peer Detection, Jul. 14, 2000, pp. 1-31 (Year: 2000).*
Author Unknown, Security Configuration and Management Avaya Secure Router 2330/4134, pp. 1-368, Aug. 2013 (Year: 2013).*
Author Unknown, GGSN Administration Guide, StarOS Release 20, Aug. 8, 2016, pp. 1-658 (Year: 2016).*

* cited by examiner

L2TP HEADER FOR HELLO REQUEST WITH HELLO DEDICATED CONTROL CHANNEL TYPE AVP

L2TP HEADER FOR HELLO REPLY WITH HELLO DEDICATED CONTROL CHANNEL TYPE AVP

LAYER 2 TUNNEL PROTOCOL ("L2TP") NODE PROCESSING OPTIMIZATION USING A DEDICATED HELLO CHANNEL KEEPALIVE MECHANISM

§ 0. RELATED APPLICATION(S)

This application claims the benefit of U.S. Provisional Application No. 62/742,228 (referred to as "the '228 provisional" and incorporated herein by reference), titled "LAYER 2 TUNNEL PROTOCOL ("L2TP") NODE PROCESSING OPTIMIZATION USING A DEDICATED HELLO CHANNEL KEEPALIVE MECHANISM," filed on Oct. 5, 2018 and listing Yogesh Prakesh Nautiyal as the inventor. The scope of the invention is not limited to any requirements of the specific embodiments in the '228 provisional.

§ 1. BACKGROUND OF THE INVENTION

§ 1.1 Field of the Invention

The present invention concerns communications networks. More specifically, the present invention concerns monitoring and control of layer 2 tunnel protocol (L2TP) tunnels.

§ 1.2 Background Information

Request for Comments 2661 "Layer Two Tunneling Protocol 'L2TP'" (Internet Engineering Task Force ("IETF"), August 1999) (referred to as "RFC 2261" and incorporated herein by reference) describes a protocol for setting up, managing, using, and terminating layer 2 tunnels.

As discussed in RFC 2661, the Point-to-Point Protocol ("PPP") described in RFC 1661 (incorporated herein by reference) defines an encapsulation mechanism for transporting multiprotocol packets across layer 2 (L2) point-to-point links. Typically, a user obtains a L2 connection to a Network Access Server (NAS) using one of a number of techniques (e.g., dialup POTS, ISDN, ADSL, etc.) and then runs PPP over that connection. In such a configuration, the L2 termination point and PPP session endpoint reside on the same physical device (i.e., the NAS).

L2TP extends the PPP model by allowing the L2 and PPP endpoints to reside on different devices interconnected by a packet-switched network. With L2TP, a user has an L2 connection to an access concentrator (e.g., modem bank, ADSL DSLAM, etc.), and the concentrator then tunnels individual PPP frames to the NAS. This allows the actual processing of PPP packets to be divorced from the termination of the L2 circuit.

RFC 2661 defines the necessary control protocol for on-demand creation of tunnels between two nodes (referred to as "tunnel endpoints", "peer tunnel endpoints", or "local and remote tunnel endpoints") and the accompanying encapsulation for multiplexing multiple, tunneled PPP sessions.

§ 1.2.1 Example L2TP Network Topologies

FIG. 1 depicts a typical L2TP scenario. The goal is to tunnel PPP frames between the Remote System 105 or LAC Client 135 and an LNS 150a or 150b located at a Home LAN 170a (which may include one or more hosts 190a) or 170b (which may include one or more hosts 190b). The Remote System 105 initiates a PPP connection across the PSTN Cloud 110 to a LAC 120a or 120b. The LAC 120a or 120b then tunnels the PPP connection across the Internet 130, Frame Relay, or ATM Cloud 140 to an LNS 150a or 150b, whereby access to a Home LAN 170a or 170b is obtained. The Remote System 105 is provided addresses from the HOME LAN 170a or 170b via PPP NCP negotiation. Authentication, Authorization and Accounting may be provided by the Home LAN's Management Domain as if the user were connected to a Network Access Server directly.

A LAC Client 135 (a Host which runs L2TP natively) may also participate in tunneling to the Home LAN 170a without use of a separate LAC 120a. In this case, the Host containing the LAC Client 135 software already has a connection to the public Internet 130. A "virtual" PPP connection is then created, and the local L2TP LAC Client 135 software creates a tunnel to the LNS 150a. As in the above case, Addressing, Authentication, Authorization and Accounting will be provided by the Home LAN's Management Domain.

§ 1.2.2 L2TP Protocol Overview

L2TP utilizes two types of messages; control messages and data messages. Control messages are used in the establishment, maintenance and clearing of tunnels and calls. Data messages are used to encapsulate PPP frames being carried over the tunnel. Control messages utilize a reliable Control Channel within L2TP to guarantee delivery (see section 5.1 of RFC 2661 for details). Data messages are not retransmitted when packet loss occurs. PPP Frames are passed over an unreliable Data Channel encapsulated first by an L2TP header and then a Packet Transport such as UDP, Frame Relay, ATM, etc. Control messages are sent over a reliable L2TP Control Channel which transmits packets in-band over the same Packet Transport.

Under RFC 2661, sequence numbers are required to be present in all control messages and are used to provide reliable delivery on the Control Channel. Data Messages may use sequence numbers to reorder packets and detect lost packets.

All values are placed into their respective fields and sent in network order (high order octets first).

As shown in FIG. 2, one or more L2TP tunnels 210 may be provided between a LAC 120 and an LNS 150, and each of the tunnel(s) 210 may support one or more channels 220.

§ 1.2.2.1 L2TP Header

Referring to FIG. 3, L2TP packets for the control channel and data channel share a common header format 300. In each case, if a field is optional, its space does not exist in the message if the field is marked not present. Note that while optional on data messages, the Length 335, Ns 350, and Nr 355 fields marked as optional, are required to be present on all control messages. As shown in FIG. 3, the Type (T) bit 305 indicates the type of message. It is set to 0 for a data message and 1 for a control message. If the Length (L) bit 310 is 1, the Length field 335 is present, but if set to 0, the optional Length field 335 is not included. This bit MUST be set to 1 for control messages. The x bits are reserved for future extensions. All reserved bits MUST be set to 0 on outgoing messages and ignored on incoming messages. If the Sequence (S) bit 315 is set to 1 the Ns 350 and Nr 355 fields are present, but if set to 0, these optional fields 350 and 355 are not included. The S 315 bit MUST be set to 1 for control messages. If the Offset (O) bit 320 is 1, the Offset Size field 360 is present, but if set to 0, this field 360 is not present. The 0 bit MUST be set to 0 (zero) for control messages. If the Priority (P) bit 325 is 1, this data message should receive preferential treatment in its local queuing and transmission. Link control protocol ("LCP") echo requests used as a keepalive for the link, for instance, should generally be sent with this bit set to 1. Without it, a temporary interval of local congestion could result in interference with keepalive messages and unnecessary loss of the link. This feature is only for use with data messages. The P bit MUST be set to 0 for all control messages.

The VERsion field 330 must be 2 for the version of L2TP described in RFC 2661. The value 1 is reserved to permit detection of L2F (See, e.g., RFC 2341, incorporated herein by reference) packets should they arrive intermixed with L2TP packets. Packets received with an unknown Ver field must be discarded. The Length field 335 indicates the total length of the message in octets. The Tunnel ID field 340 indicates the identifier for the control connection. L2TP tunnels are named by identifiers that have local significance only. That is, the same tunnel may be given different Tunnel IDs by each end of the tunnel. The value carried in the Tunnel ID filed 340 in each message is that of the intended recipient, not the sender. Tunnel IDs are selected and exchanged as Assigned Tunnel ID AVPs during the creation of a tunnel. The value in the Session ID field 345 indicates the identifier for a session within a tunnel. L2TP sessions are named by identifiers that have local significance only. That is, the same session may be given different Session IDs by each end of the session. The value in the Session ID field 345 in each message is that of the intended recipient, not the sender. Session IDs are selected and exchanged as Assigned Session ID AVPs during the creation of a session. The Ns field 350 indicates the sequence number for this data or control message, beginning at zero and incrementing by one (modulo 216) for each message sent. The Nr field 355 indicates the sequence number expected in the next control message to be received. Thus, the value in the Nr field 355 is set to the value of the Ns field 350 of the last in-order message received plus one (modulo 216). In data messages, Nr is reserved and, if present (as indicated by the S-bit), is to be ignored upon receipt. Finally, the Offset Size field 360, if present, specifies the number of octets past the L2TP header 300 at which the payload data is expected to start. Actual data within the offset padding is undefined. If the offset field 360 is present, the L2TP header 300 ends after the last octet of the offset padding.

§ 1.2.2.2 L2TP Control Messages

The Message Type AVP, described below, defines the specific type of control message being sent. Recall that this is only for control messages; that is, messages with the T-bit set to 1.

The following control message types are used for control connection management:
 1 (SCCRQ) Start-Control-Connection-Request
 2 (SCCRP) Start-Control-Connection-Reply
 3 (SCCCN) Start-Control-Connection-Connected
 4 (StopCCN) Stop-Control-Connection-Notification
 5 (reserved)
 6 (HELLO) Hello

§ 1.2.2.2.1 L2TP Control Message Attribute Value Pairs (AVPs)

To maximize extensibility while still permitting interoperability, a uniform method for encoding message types and bodies is used throughout L2TP. This encoding is referred to as AVP (Attribute-Value Pair). Referring to FIG. 4, the first six (6) bits of an AVP 400 are a bit mask describing the general attributes of the AVP. The RESERVED bits 415 are reserved for future extensions and are to be set to 0. Mandatory (M) bit 405 controls the behavior required of an implementation which receives an AVP which it does not recognize. If the M bit 405 is set on an unrecognized AVP within a message associated with a particular session, the session associated with this message is to be terminated. If the M bit 405 is set on an unrecognized AVP within a message associated with the overall tunnel, the entire tunnel (and all sessions within) is to be terminated. If the M bit 405 is not set, an unrecognized AVP is to be ignored. The control message must then continue to be processed as if the AVP had not been present. The hidden (H) bit 410 identifies the hiding of data in the Attribute Value field 435 of an AVP 400. This capability can be used to avoid the passing of sensitive data, such as user passwords.

Following the first six (6) bits, the Length field 420 encodes the number of octets (including the Overall Length and bitmask fields) contained in the AVP 400. The value carried in the Length field may be calculated as 6+the length of the Attribute Value field 435 in octets. The Length field 420 itself is 10 bits, permitting a maximum of 1023 octets of data in a single AVP. The minimum Length of an AVP 400 is 6. If the length is 6, then the Attribute Value field 435 is absent. Next, the vendor ID field 425 is to carry the Internet Assigned Numbers Authority ("IANA") assigned "SMI Network Management Private Enterprise Codes" (See, e.g., RFC 1700, incorporated herein by reference.) value. The value 0, corresponding to IETF adopted attribute values, may be used for all AVPs 400. Any vendor wishing to implement their own L2TP extensions can use their own Vendor ID 425 along with private Attribute values, guaranteeing that they will not collide with any other vendor's extensions, nor with future IETF extensions. Note that there are 16 bits allocated for the Vendor ID 425, thus limiting this feature to the first 65,535 enterprises. Example embodiments consistent with the present description may optionally use the Vendor ID 425, with a private attribute value 435, as described below. The Attribute Type field 430 is a two (2) octet value with a unique interpretation across all AVPs 400 defined under a given Vendor ID 425. Finally, the Attribute Value field 435 is to carry the actual value as indicated by the Vendor ID 425 and Attribute Type 430. It follows immediately after the Attribute Type field 430, and runs for the remaining octets indicated in the Length (i.e., Length minus 6 octets of header) field 420. This field 435 is absent if the value in the Length field 420 is 6.

Thus, a tunnel exists between two L2TP endpoints (referred to as the "local tunnel endpoint" and the "peer tunnel endpoint" or "remote tunnel endpoint").

§ 1.2.2.2.2 L2TP Keepalive Control Messages and Potential Problems Associated with Such Keepliave Control Messages Section 6.5 of RFC 2661 describes "Hello" (HELLO) control messages. More specifically, the Hello message is an L2TP control message sent by either peer of a LAC-LNS control connection. This control message is used as a "keepalive" for the tunnel. Keepalives for the tunnel may be implemented by sending a HELLO if a period of time (a recommended default is 60 seconds, but should be configurable) has passed without receiving any message (data or control) from the peer.

As with all messages sent on the control connection, per RFC 2661, the receiver will return either a Zero Length Body Acknowledgement ("ZLB ACK") or an (unrelated) message piggybacking the necessary acknowledgement information. Since a HELLO is a control message, and control messages are reliably sent by the lower level transport, this keepalive function operates by causing the transport level to reliably deliver a message. If a media interruption has occurred, the reliable transport will be unable to deliver the HELLO across, and will clean up (i.e., remove) the tunnel. HELLO messages are global to the tunnel. The Session ID 345 in a HELLO message is to be 0.

Thus, as a keepalive mechanism on tunnel, an L2TP tunnel endpoint sends "Hello" message which needs to be acknowledged by the peer tunnel endpoint by sending explicit "ZLB" message. As just noted above, under RFC 2661, L2TP keepalive message are control messages. By definition control message govern aspects of the tunnel and sessions within the tunnel. As further noted in RFC 2661, all control messages are mandated to include a sequence number in order to enable reliable delivery. Each L2TP endpoint maintains two sequence number counters; "Ns" and "Nr". "Ns" stands for next-send sequence number of the local tunnel endpoint, and "Nr" stands for next-receive sequence number from the peer tunnel endpoint.

The L2TP Hello message contains the "Ns" and "Nr" value. The transmission of an L2TP Hello will cause Ns to be incremented. In response, the recipient of the Hello sends a ZLB back to the sender, to acknowledge its receipt of the Hello message. The transmission of a ZLB does not cause Ns to be incremented, but does cause Nr to be incremented.

Since the sequencing mechanism is implemented in control plane, this forces L2TP hello messages to be processed by the control plane. That is, L2TP hello messages under RFC 2661 cannot be "inlined" to forwarding plane. This can lead to problems, particularly when one controller operates multiple forwarding planes (e.g., for a network scenario like Control and User Plane Separation ("CUPS")). For example, this may cause a bottleneck at a controller since keepalive messages from all forwarding planes get routed to controller. Under certain scenarios, the controller may become stressed, causing an unacceptable latency in handling the keepalive messages. This, in turn, may cause false tunnel timeouts, resulting in the tunnel being brought down when it should stay up.

In view of the foregoing, it would be useful to improve the keepalive implementation used in L2TP tunnels.

§ 2. SUMMARY OF THE INVENTION

Example embodiments consistent with the present description introduce the set up and use of a separate dedicated channel for tunnel keepalive exchanges. The dedicated channel operates within the same tunnel. Using such a dedicated channel permits tunnel keepalives to be processed completely at forwarding plane, without needing to send them to the control plane for processing.

This dedicated channel can implement its own sequencing (in a way that avoids the need to use the control plane for processing). Alternatively, this dedicated channel might not use sequencing at all.

§ 3. BRIEF DESCRIPTION OF THE DRAWINGS

§ 4. DETAILED DESCRIPTION

Figure 1:
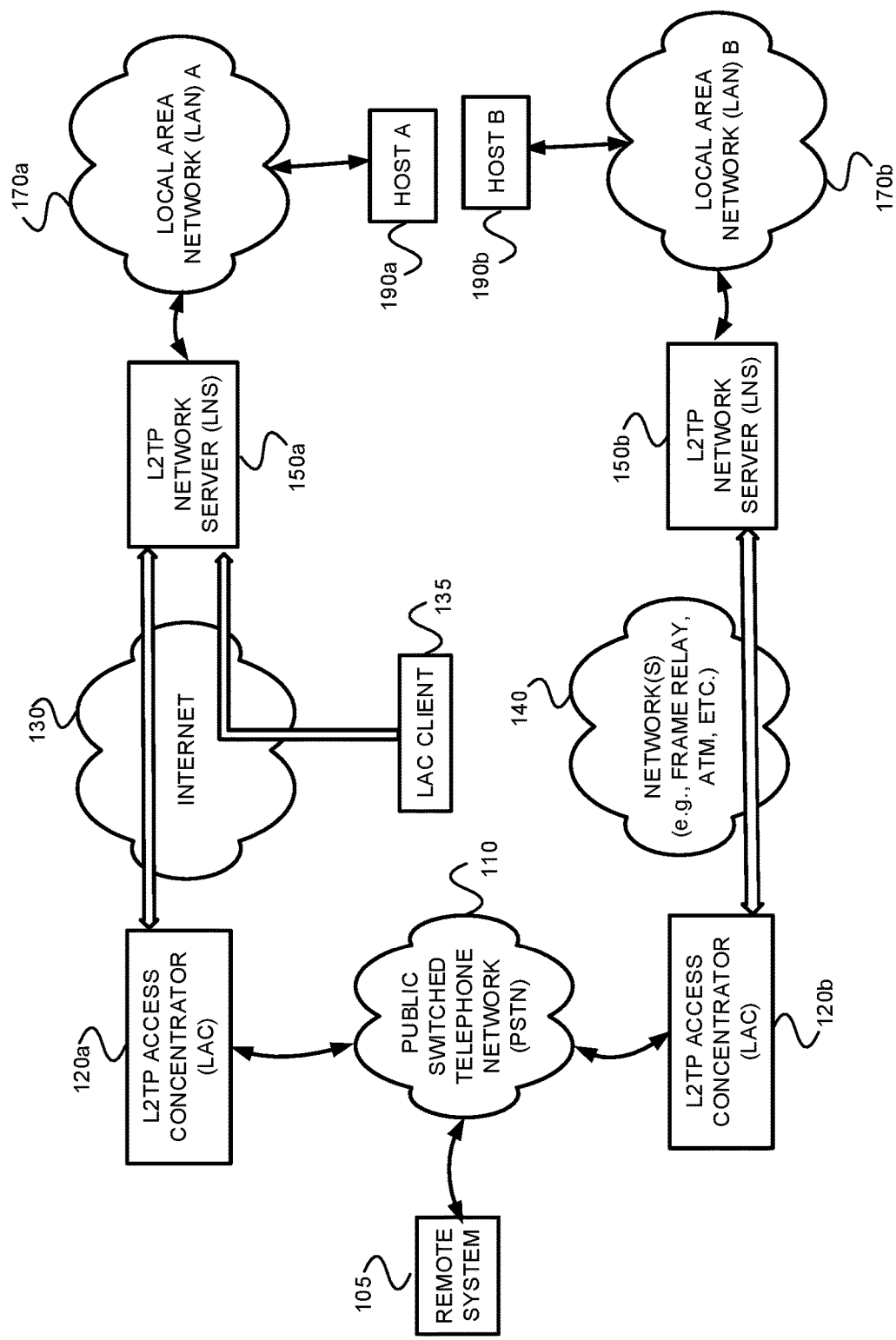
FIG. 1 illustrates an example network topology employing L2TP tunnels.
Figure 2:
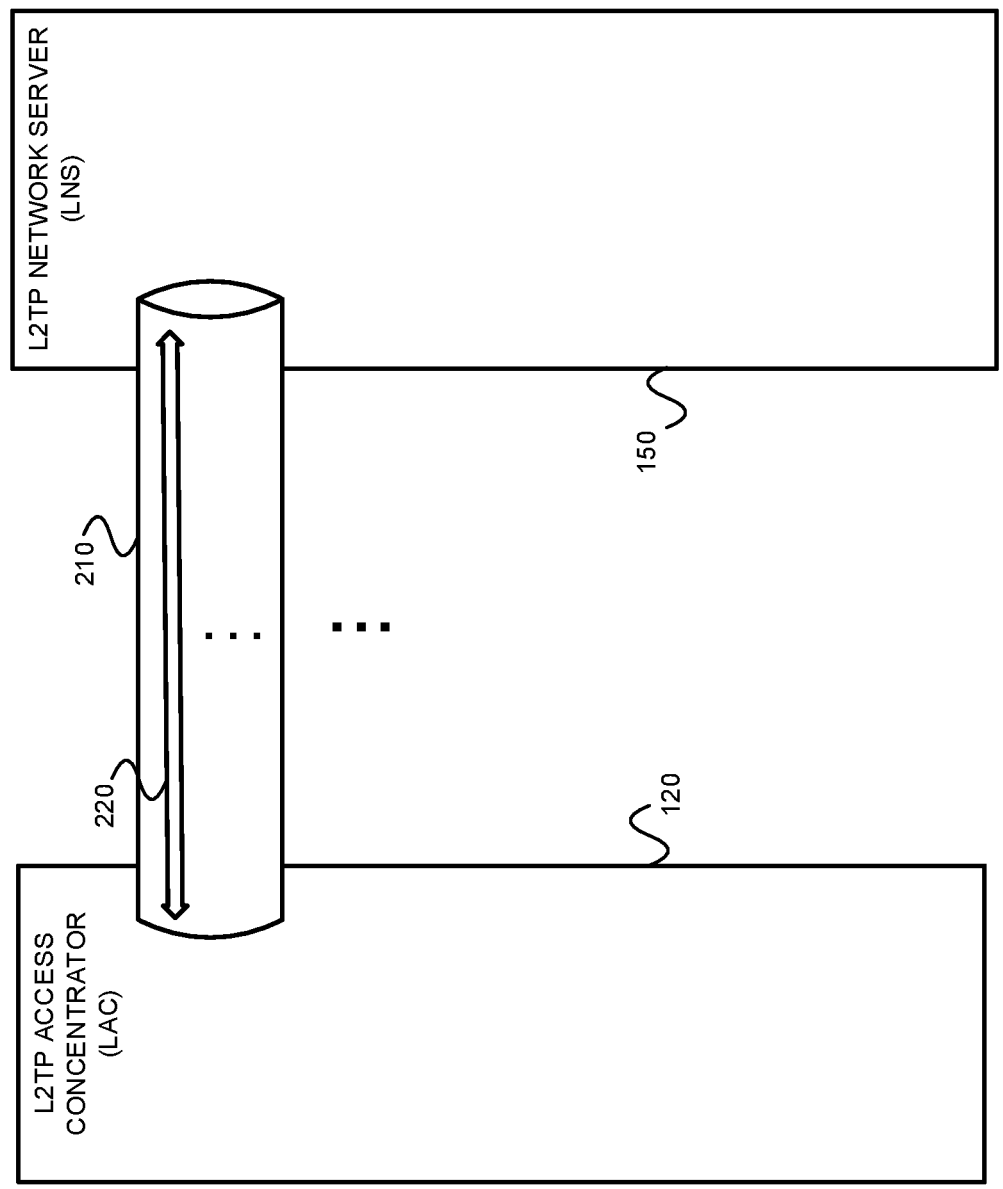
FIG. 2 illustrates how one or more L2TP tunnels may be provided between a LAC and an LNS, and how each of the tunnel(s) may support one or more channels.
Figure 3:
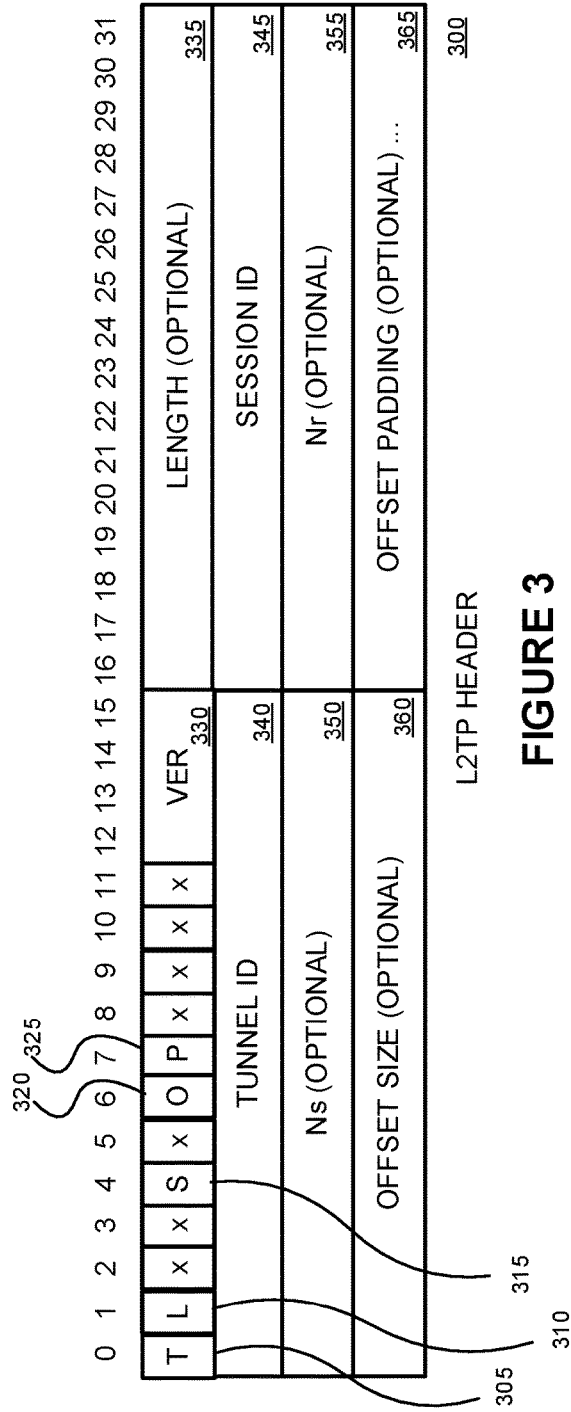
FIG. 3 illustrates an L2TP header in accordance with RFC 2661.
Figure 4:
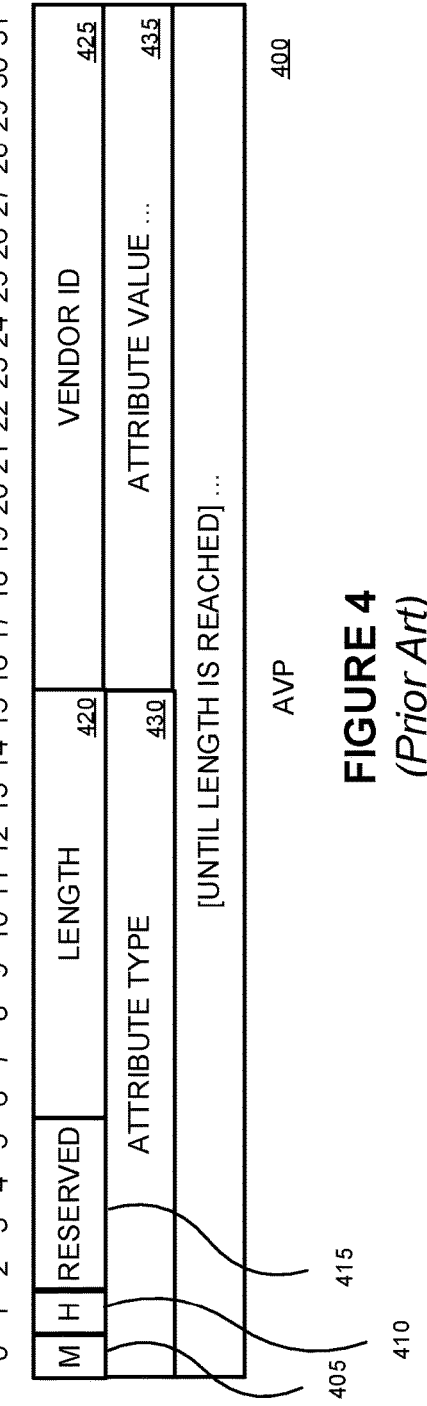
FIG. 4 illustrates an AVP in accordance with RFC 2661.

The present invention may involve novel methods, apparatus, message formats, and/or data structures for increasing establishing and using a dedicated hello channel for L2TP keepalive messaging. The following description is presented to enable one skilled in the art to make and use the invention, and is provided in the context of particular applications and their requirements. Thus, the following description of example embodiments provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

§ 4.1 Definitions

Attribute Value Pair (AVP): The variable length concatenation of a unique Attribute (represented by an integer) and a Value containing the actual value identified by the attribute. Multiple AVPs make up Control Messages which are used in the establishment, maintenance, and teardown of tunnels.

Call: A connection (or attempted connection) between a Remote System and LAC. For example, a telephone call through the PSTN. A Call (Incoming or Outgoing) which is successfully established between a Remote System and LAC results in a corresponding L2TP Session within Call, Outgoing Call).

Control Connection: A control connection operates in-band over a tunnel to control the establishment, release, and maintenance of sessions and of the itself.

Control Messages: Control messages are exchanged between LAC and LNS pairs, operating in-band within the tunnel protocol. Control messages govern aspects of the tunnel and sessions within the tunnel.

DSLAM: Digital Subscriber Line (DSL) Access Module. A network device used in the deployment of DSL service. This is typically a concentrator of individual DSL lines located in a central office (CO) or local exchange.

Incoming Call: A Call received at an LAC to be tunneled to an LNS (see Call Outgoing Call). L2TP Access Concentrator (LAC): A node that acts as one side of an L2TP tunnel endpoint and is a peer to the L2TP Network Server (LNS). The LAC may sit between an LNS and a remote system and forwards packets to and from each. Packets sent from the LAC to the LNS may requires tunneling with the L2TP protocol. The connection from the LAC to the remote system may be either local (e.g., a Client LAC) or a PPP link.

L2TP Network Server (LNS): A node that acts as one side of an L2TP tunnel endpoint and is a peer to the L2TP Access Concentrator (LAC). The LNS is the logical termination point of a PPP session that is being tunneled from the remote system by the LAC.

Network Access Server (NAS): A device providing local network access to users across a remote access network such as the PSTN. An NAS may also serve as a LAC, LNS or both.

Peer: When used in context with L2TP, peer refers to either the LAC or LNS. A LAC's Peer is an LNS and vice versa. When used in context with PPP, a peer is either side of the PPP connection.

POTS: Plain Old Telephone Service.

Remote System: An end-system or router attached to a remote access network (i.e. a PSTN), which is either the initiator or recipient of a call. Also referred to as a dial-up or virtual dial-up client.

Session: L2TP is connection-oriented. The LNS and LAC maintain state for each Call that is initiated or answered by a LAC. An L2TP Session is created between the LAC and LNS when an end-to-end PPP connection is established between a Remote System and the LNS. Datagrams related to the PPP connection are sent over the Tunnel between the LAC and LNS. There is a one to one relationship between established L2TP Sessions and their associated Calls.

Tunnel: A Tunnel exists between a LAC-LNS pair. The Tunnel consists of a Control Connection and zero or more L2TP Sessions. The Tunnel carries encapsulated PPP datagrams and Control Messages between the LAC and the LNS.

Zero-Length Body (ZLB) Message: A control packet with only an L2TP header. ZLB messages are used for explicitly acknowledging packets on the reliable control channel.

Figure 5:
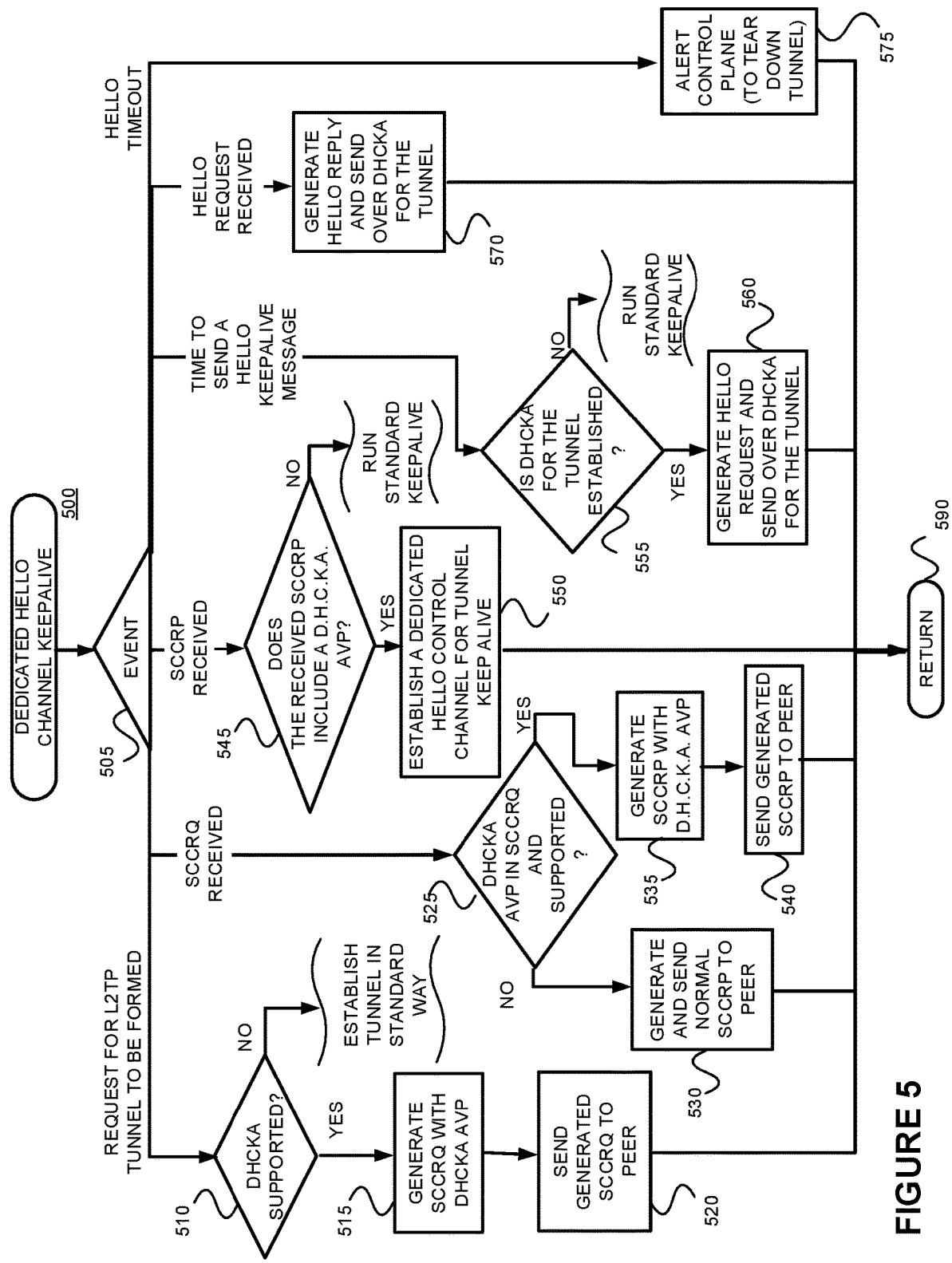
FIG. 5 is a flow diagram illustrating an example method for setting up and using dedicated hello channel keepalives.

§ 4.2 Example Method for Setting Up a Dedicated Hello Channel and for Managing Keepalive Messaging Over the Dedicated Hello Channel FIG. 5 is a flow diagram illustrating an example method 500 for setting up and using dedicated hello channel keepalives (DHCKA). The example method 500 is to be performed by each of the endpoints of a tunnel, such as an L2TP tunnel. As shown, various branches of the example method 500 are performed in response to the occurrence of various events 505. The left-most, second to the left and middle branches of the method 500 concern setting up a dedicated hello channel for tunnel keepalive messaging, while the three right branches of the method 500 concern messaging over a using a previously set up dedicated hello channel for tunnel keepalive.

The left-most branch of the example method 500 is performed in response to a (internal or received) request to form a L2TP tunnel. It is determined whether or not DHCKA is supported by the local tunnel endpoint. (Decision 510) If not, an L2TP tunnel is established in a standard way (e.g., per RFC 2661). Otherwise, if it is determined that DHCKA is supported by the local tunnel endpoint, a SCCRQ control message (See, e.g., section 6.1 of RFC 2661.), including a DHCKA AVP, is generated. (Block 510) The generated SCCRQ control message including the DHCKA AVP is then sent to the peer tunnel endpoint. (Block 520) That is, the local tunnel endpoint that initiates the tunnel sends the SCCRQ message to the peer (remote) endpoint. If supported, this SCCRQ message will include a new AVP which will indicate support of dedicated channel for hello.

Figure 6:
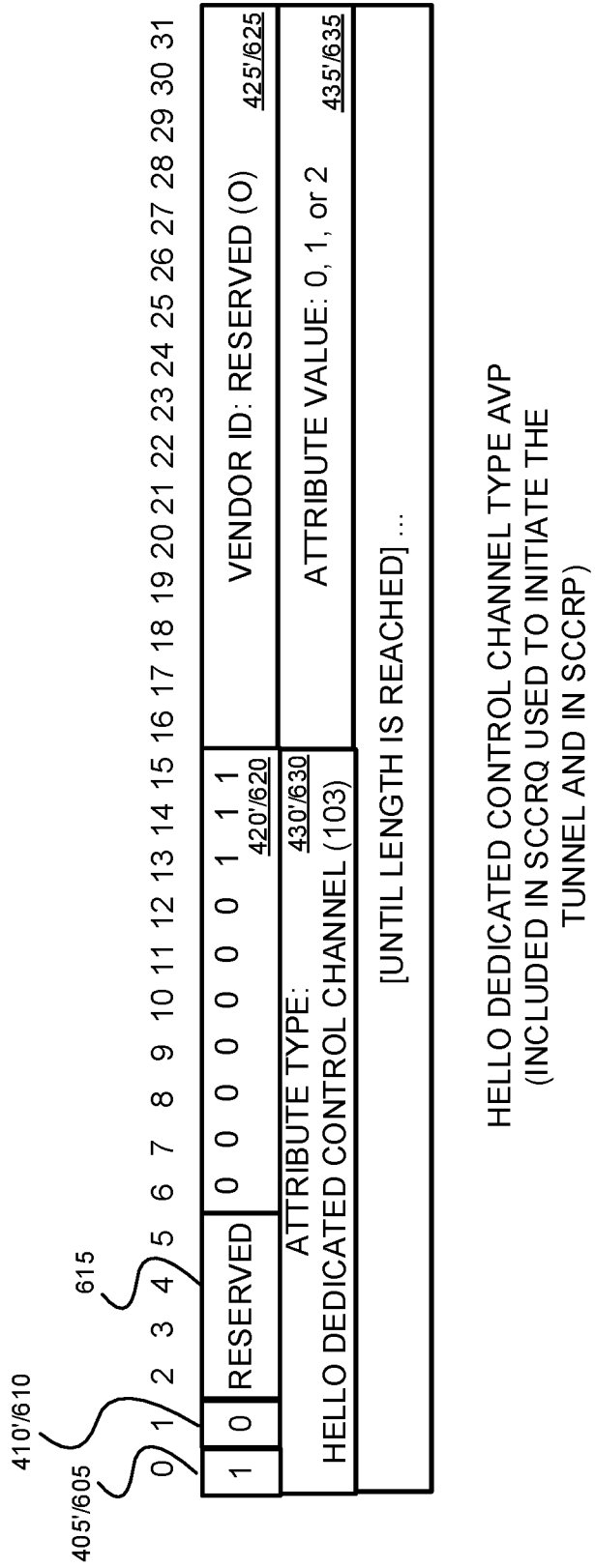
FIG. 6 illustrates the format of an example hello dedicated channel type AVP, which may be included in SCCRQ and SCCRP control messages.

Referring back to block 515, FIG. 6 illustrates an example DHCKA AVP 600 to be included in the SCCRQ control message. That is a new control message AVP is introduced during tunnel establishment stage to negotiate for setting a dedicated control channel for hello messages. The example DHCKA AVP 600 of FIG. 6 includes a Mandatory bit M 405'/605 set to 0, a Hidden bit H 410'/610 set to 0 (i.e., False), the Length field 420'/620 set to 00 0000 0111 (i.e., 7), and a Vendor ID field 425'/625 set to 0 (i.e., Reserved). The example DHCKA 600 of FIG. 6 further includes an Attribute Type field 430'/630 set to a value that has been registered to indicate that the AVP is Hello Dedicated Control Channel (e.g., 103), and an Attribute Value field 435'/635 set to indicate that Hello Dedicated Control Channel is supported. For example, a value of 0 may be used to indicate no support, a value of 1 may be used to indicate support without sequence numbers, and a value of 2 may be used to indicate support with sequence numbers.

Note that the new AVP Attribute Type may be an unassigned value from control Message AVP type maintained by, and registered with, IANA at (https://www.iana.org/assignments/l2tp-parameters/l2tp-parameters.xml#l2tp-parameters-1). The currently unassigned value of 103 was used in the example of FIG. 6, but another unassigned value (or unique Vendor ID, Attribute Type pair) can be used instead. This may require a separate AVP type.

Assume now that the example method 500 is being performed at the peer (remote) tunnel endpoint. Responsive to an SCCRQ message being received, whether or not both the received SCCRQ includes the DHCKA AVP and the peer tunnel endpoint supports DHCKA is determined. (Decision 525) If either or both are not true, the example method 500 generates and sends a normal SCCRP message (See, e.g., section 6.2 of RFC 2661.) to the other tunnel endpoint (which sent the SCCRQ). (Decision 525 NO, and Block 530) If, on the other hand, it is determined that both the received SCCRQ includes the DHCKA AVP and the peer tunnel endpoint supports DHCKA, the peer tunnel endpoint generates an SCCRP control message including a DHCKA AVP and sends the generated SCCRP to the other tunnel endpoint. (Decision 525 YES and Blocks 535 and 540)

Thus, the peer endpoint that receives the SCCRQ control message sends a SCCRP control message in response. This SCCRP control message will or will not include the DHCKA AVP new AVP (Recall, e.g., 600 of FIG. 6.) depending on whether the SCCRQ included a DHCKA AVP and whether the peer (remote) tunnel endpoint supports dedicated hello channel keepalive.

Assume now that the local tunnel endpoint receives an SCCRP. In response, the example method 500 determines whether or not the received SCCRP includes a DHCKA AVP. (Decision 545) If not (Decision 545, NO), the tunnel is created and standard keepalive (e.g., per RFC 2661) is performed. If, on the other hand, the received SCCRP includes a DHCKA AVP (Decision 545, YES), then a dedicated hello control channel is established. (Block 550)

Having described how a dedicated hello channel for a tunnel's keepalive can be established, its use for keepalives is now described with the reference to the three (3) right branches of the example method 500. To isolate the example keepalive process from the current keepalive mechanism (e.g., per RFC 2661), new control message types—"Hello Request" and "Hello Reply"—are used. Example formats for these new control message types are described below with reference to FIGS. 7 and 8.

The keepalive message exchange consistent with example method 500 is similar to the keepalive implementation described in RFC 2661 in that a tunnel endpoint waits for configurable number of retry responses before declaring tunnel is down. Referring to the Event block 505 of FIG. 5, in response to it being time to send a hello keepalive message, it is determined whether a DHCKA is established for the tunnel. (Decision 555) If not (Decision 555, NO), the standard keepalive (See, e.g., sections 5.5 and 6.5 of RFC 2661.) is run. If, on the other hand, a DHCKA is established for the tunnel (Decision 555, YES), a "Hello Request" (an example of which is described below) is generated and send over the DHCKA of the tunnel. (Block 560)

Figure 7:
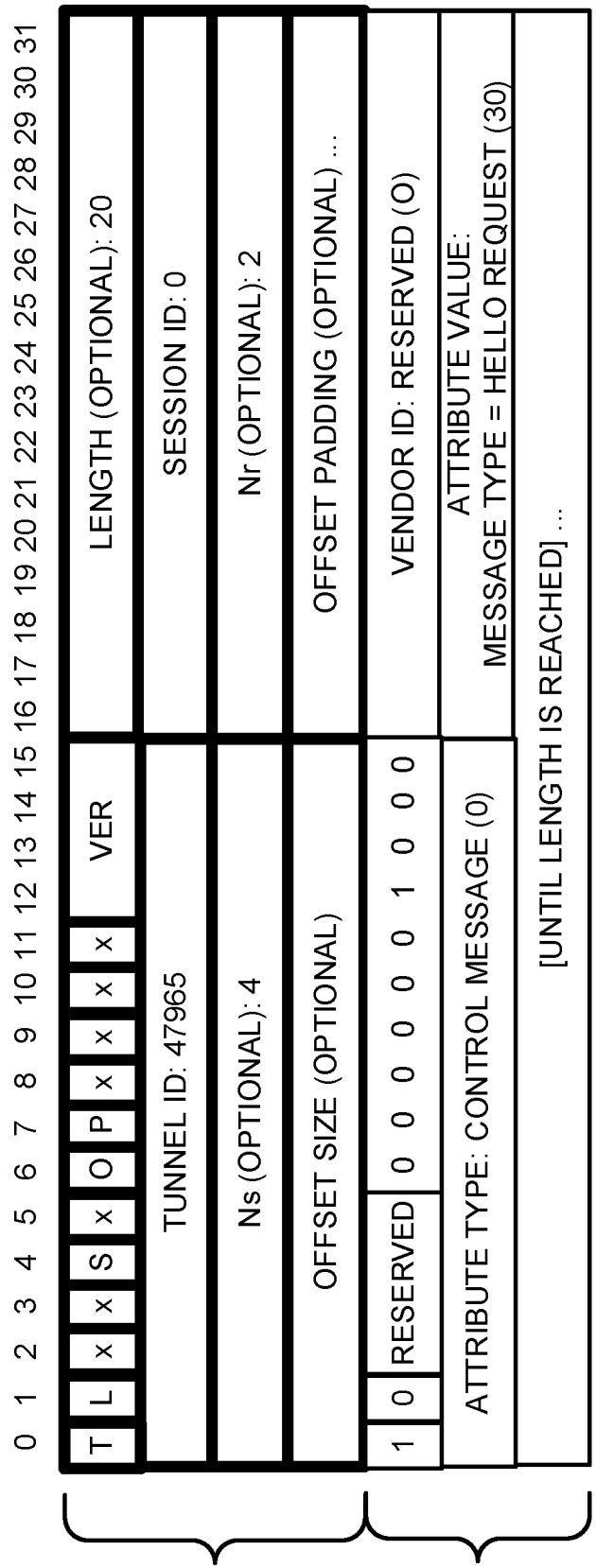
FIG. 7 illustrates the format of an example Hello Request control message.

Still referring to block 560, the keepalive message under RFC 2661 is referred to as "Hello" only. A "Hello Request" consistent with the example method 500 will be sent over the dedicated hello channel keepalive for the tunnel. FIG. 7 illustrates an example L2TP header format for such an example "Hello Request" message. As shown, the "Packet Type" is a Control Message with Tunnel ID set to 47965, the Session ID set to 0, the Length set to 20, the optional Ns set to 4 and the optional Nr set to 2. The Control Message AVP has the Mandatory (M) bit is set to 1 (i.e., True), the Hidden bit is set to 0 (i.e., False), the Length field is set to 00 0000 1000 (=8), the Vendor ID field is set to 0 (i.e., Reserved), the AVP Type field is set to 0 (i.e., a Control Message), and the Attribute Value field specifies the message type as a Hello Request (e.g., 30). The value in the Tunnel ID field is just an example. The value of 0 in the Session ID field indicates that the message does not belong to a given session; rather, it belongs to the tunnel. Note that the value of 30 in the Attribute Value field is an arbitrary unassigned message type. The ultimate value to be used would be registered with IANA (https://www.iana.org/assignments/12tp-parameters/12tp-parameters.xml#12tp-parameters-2). Alternatively, a unique combine Vendor ID and Attribute Value pair may be used. However, such an alternative might require a separate AVP type to account for multiple vendors.

Figure 8:
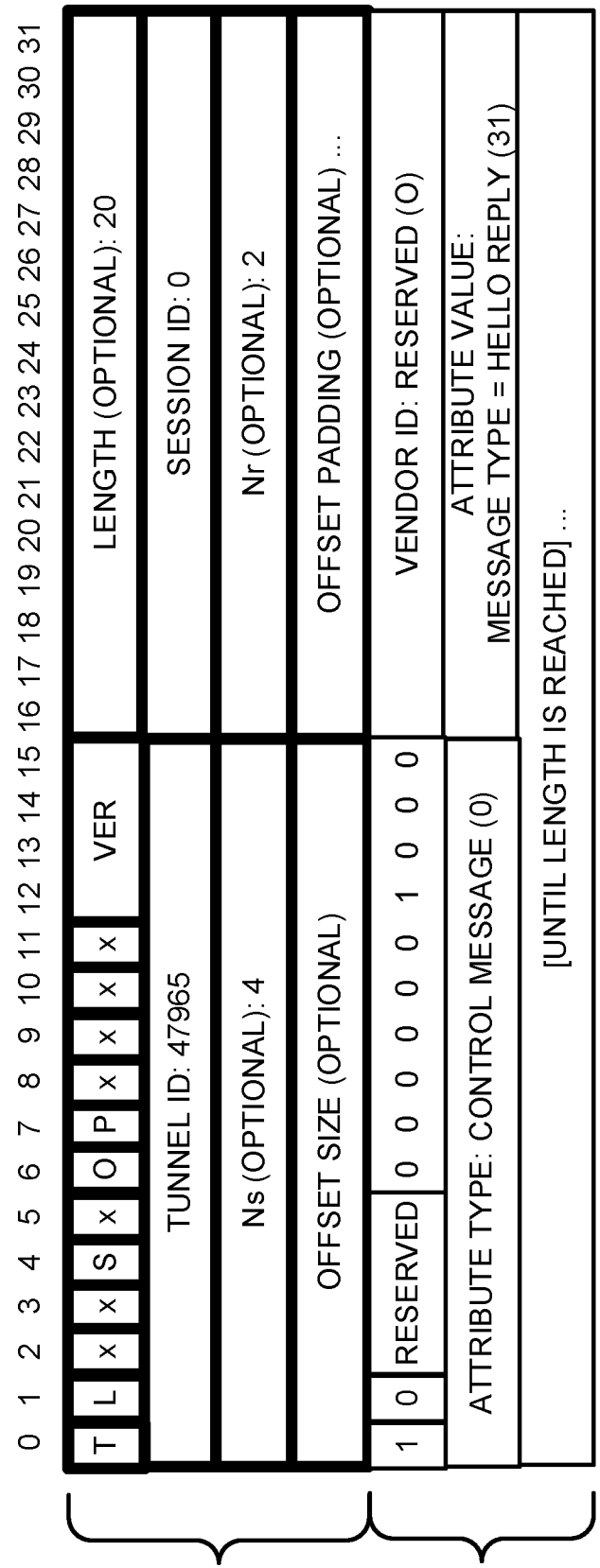
FIG. 8 illustrates the format of an example Hello Reply control message.

Referring back to FIG. 5, in response to a tunnel endpoint receiving a "Hello Request" message, the tunnel endpoint will generate a "Hello Reply" message and send it back to the tunnel endpoint that originated the "Hello Request" over the DHCKA of the tunnel. (Block 570) That is, the "Hello Reply" is a control message which explicitly acknowledges the "Hello Request" from the peer tunnel endpoint. Referring to FIG. 8, the example L2TP header format for the example "Hello Reply" message is very similar to that for the L2TP header of the "Hello Request" message of FIG. 7. That is, the Tunnel ID is set to 47965, the Session ID is set to 0, the Length is set to 20, the optional Ns is set to 4 and the optional Nr is set to 2. The Control Message AVP has the Mandatory (M) bit is set to 1 (i.e., True), the Hidden bit is set to 0 (i.e., False), the Length field is set to 00 0000 1000 (=8), the Vendor ID field is set to 0 (i.e., Reserved), the AVP Type field is set to 0 (i.e., a Control Message), and the Attribute Value field specifies the message type as a Hello Reply (e.g., 31). The value in the Tunnel ID field is just an example. The value of 0 in the Session ID field indicates that the message does not belong to a given session; rather, it belongs to the tunnel. Note that the value of 31 in the Attribute Value field is an arbitrary unassigned message type. The ultimate value to be used would be registered with IANA (https://www.iana.org/assignments/12tp-parameters/12tp-parameters.xml#12tp-parameters-2).

Referring back to FIG. 5, if a hello timeout condition occurs (e.g., no "Hello Reply" received in response to a "Hello Request" message sent a configurable time ago, and/or no "Hello Reply" received in response to a configurable number of "Hello Requests" sent), the tunnel endpoint running the example method 500 will alert its control plane so that the control plane can terminate or "tear down" the tunnel associated with the DHCKA (and identified by the Tunnel ID field). Note that the control plane only becomes involved in the keepalive scheme when it is time to tear down a tunnel. That is, the forwarding plane may inform the control plane about the keepalive expiry on the tunnel by sending an application message. This application message can be inserted in a TLV in the protocol mechanism established for communication between control plane and forwarding plane. As should be appreciated from the foregoing, in this way, scenarios such as those discussed in section 1.2.2.2.2 above, in which the controller may become stressed, causing an unacceptably latency in handling the keepalive messages are avoided. This, in turn, avoids the problem of false tunnel timeouts, resulting in the tunnel being brought down when it should not be.

Still referring to the example method 500 of FIG. 5, any endpoint of a tunnel with an associated DHCKA can initiate a "Hello Request" and other endpoint of the tunnel will reply with a "Hello Reply".

Referring back to FIGS. 7 and 8, although these examples used Ns and Nr in the L2TP header, this is not required. That is, there are two implementation approaches. The first approach does not use Ns and Nr values in L2TP header. These values may be set to 0. (The same methodology is used by GRE tunnel keepalive which does not use the sequence number.) The second approach uses valid Ns and Nr values in L2TP header, and the Ns and Nr values are meant for the dedicated control channel for the Hello Request-Hello Reply exchange only. Recall that that approach used may be specified by properly setting the attribute value 435'/635 in the AVP included in SCCRQ and SCCRP messages used when setting up the tunnel.

§ 4.3 Example Apparatus

Figure 9:
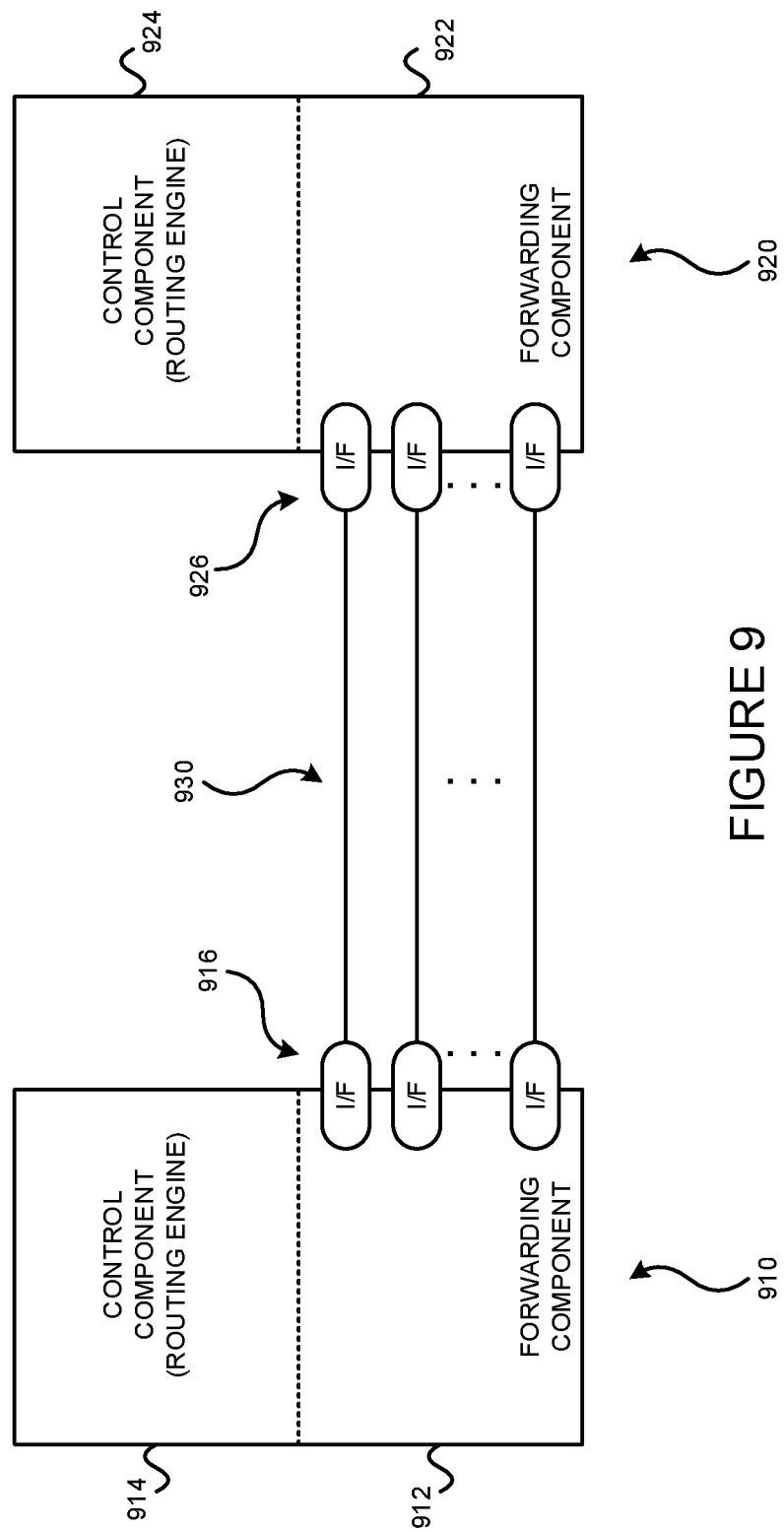
FIG. 9 illustrates two data forwarding systems, which may be used as L2TP tunnel peers, coupled via communications links.

FIG. 9 illustrates two data forwarding systems 910 and 920 coupled via communications links 930. The links may be physical links or "wireless" links. The data forwarding systems 910,920 may be routers for example, and may be a LAC and an LNS. If the data forwarding systems 910,920 are example routers, each may include a control component (e.g., a routing engine) 914,924 and a forwarding component 912,922. Each data forwarding system 910,920 includes one or more interfaces 916,926 that terminate one or more communications links 930. Recall that the example method 500 may be implemented on the forwarding component 912,922, but may alert a control component 914,924. (Recall, e.g., block 575 of FIG. 5.)

As just discussed above, and referring to FIG. 10, some example routers 1000 include a control component (e.g., routing engine) 1010 and a packet forwarding component (e.g., a packet forwarding engine) 1090.

The control component 1010 may include an operating system (OS) kernel 1020, routing protocol process(es) 1030, label-based forwarding protocol process(es) 1040, interface process(es) 1050, user interface (e.g., command line interface) process(es) 1060, and chassis process(es) 1070, and may store routing table(s) 1039, label forwarding information 1045, and forwarding (e.g., route-based and/or label-based) table(s) 1080. As shown, the routing protocol process(es) 1030 may support routing protocols such as the routing information protocol ("RIP") 1031, the intermediate system-to-intermediate system protocol ("IS-IS") 1032, the open shortest path first protocol ("OSPF") 1033, the enhanced interior gateway routing protocol ("EIGRP") 1034 and the boarder gateway protocol ("BGP") 1035, and the label-based forwarding protocol process(es) 1040 may support protocols such as BGP 1035, the label distribution protocol ("LDP") 1036 and the resource reservation protocol ("RSVP") 1037. One or more components (not shown) may permit a user 1065 to interact with the user interface process(es) 1060. Similarly, one or more components (not shown) may permit an outside device to interact with one or more of the router protocol process(es) 1030, the label-based forwarding protocol process(es) 1040, the interface process(es) 1050, and the chassis process(es) 1070, via SNMP 1085, and such processes may send information to an outside device via SNMP 1085.

The packet forwarding component 1090 may include a microkernel 1092, interface process(es) 1093, distributed ASICs 1094, chassis process(es) 1095 and forwarding (e.g., route-based and/or label-based) table(s) 1096.

Figure 10:
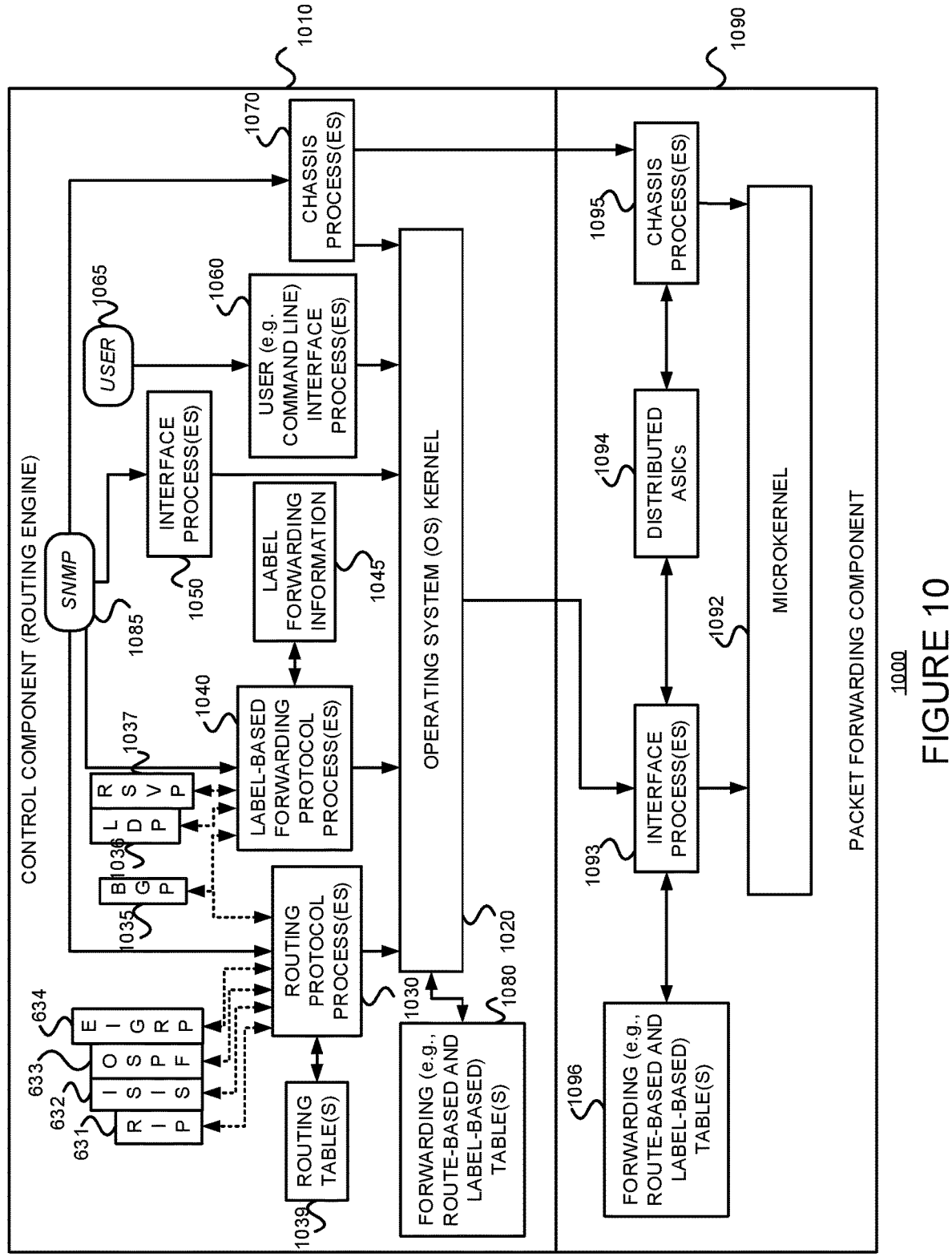
FIG. 10 is a block diagram of a router which may be used as an L2TP tunnel endpoint.

In the example router 1000 of FIG. 10, the control component 1010 handles tasks such as performing routing protocols, performing label-based forwarding protocols, control packet processing, etc., which frees the packet forwarding component 1090 to forward received packets quickly. That is, received control packets (e.g., routing protocol packets and/or label-based forwarding protocol packets) are not fully processed on the packet forwarding component 1090 itself, but are passed to the control component 1010, thereby reducing the amount of work that the packet forwarding component 1090 has to do and freeing it to process packets to be forwarded efficiently. Thus, the control component 1010 is primarily responsible for running routing protocols and/or label-based forwarding protocols, maintaining the routing tables and/or label forwarding information, sending forwarding table updates to the packet forwarding component 1090, and performing system management. The example control component 1010 may handle routing protocol packets, provide a management interface, provide configuration management, perform accounting, and provide alarms. The processes 1030, 1040, 1050, 1060 and 1070 may be modular, and may interact with the OS kernel 1020. That is, nearly all of the processes communicate directly with the OS kernel 1020. Using modular software that cleanly separates processes from each other isolates problems of a given process so that such problems do not impact other processes that may be running. Additionally, using modular software facilitates easier scaling.

Still referring to FIG. 10, the example OS kernel 1020 may incorporate an application programming interface ("API") system for external program calls and scripting capabilities. The control component 1010 may be based on an Intel PCI platform running the OS from flash memory, with an alternate copy stored on the router's hard disk. The OS kernel 1020 is layered on the Intel PCI platform and establishes communication between the Intel PCI platform and processes of the control component 1010. The OS kernel 1020 also ensures that the forwarding tables 1096 in use by the packet forwarding component 1090 are in sync with those 1080 in the control component 1010. Thus, in addition to providing the underlying infrastructure to control component 1010 software processes, the OS kernel 1020 also provides a link between the control component 1010 and the packet forwarding component 1090.

Referring to the routing protocol process(es) 1030 of FIG. 10, this process(es) 1030 provides routing and routing control functions within the platform. In this example, the RIP 1031, ISIS 1032, OSPF 1033 and EIGRP 1034 (and BGP 1035) protocols are provided. Naturally, other routing protocols may be provided in addition, or alternatively. Similarly, the label-based forwarding protocol process(es) 1040 provides label forwarding and label control functions. In this example, the LDP 1036 and RSVP 1037 (and BGP 1035) protocols are provided. Naturally, other label-based forwarding protocols (e.g., MPLS) may be provided in addition, or alternatively. In the example router 1000, the routing table(s) 1039 is produced by the routing protocol process(es) 1030, while the label forwarding information 1045 is produced by the label-based forwarding protocol process(es) 1040.

Still referring to FIG. 10, the interface process(es) 1050 performs configuration of the physical interfaces (Recall, e.g., 916 and 926 of FIG. 9.) and encapsulation.

The example control component 1010 may provide several ways to manage the router. For example, it 1010 may provide a user interface process(es) 1060 which allows a system operator 1065 to interact with the system through configuration, modifications, and monitoring. The SNMP 1085 allows SNMP-capable systems to communicate with the router platform. This also allows the platform to provide necessary SNMP information to external agents. For example, the SNMP 1085 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1010, thereby avoiding slowing traffic forwarding by the packet forwarding component 1090.

Although not shown, the example router 1000 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1060 via a console port, an auxiliary port, and/or a management Ethernet port The packet forwarding component 1090 is responsible for properly outputting received packets as quickly as possible. If there is no entry in the forwarding table for a given destination or a given label and the packet forwarding component 1090 cannot perform forwarding by itself, it 1090 may send the packets bound for that unknown destination off to the control component 1010 for processing. The example packet forwarding component 1090 is designed to perform Layer 2 and Layer 3 switching, route lookups, and rapid packet forwarding.

As shown in FIG. 10, the example packet forwarding component 1090 has an embedded microkernel 1092, interface process(es) 1093, distributed ASICs 1094, and chassis process(es) 1095, and stores a forwarding (e.g., route-based and/or label-based) table(s) 1096. The microkernel 1092 interacts with the interface process(es) 1093 and the chassis process(es) 1095 to monitor and control these functions. The interface process(es) 1092 has direct communication with the OS kernel 1020 of the control component 1010. This communication includes forwarding exception packets and control packets to the control component 1010, receiving packets to be forwarded, receiving forwarding table updates, providing information about the health of the packet forwarding component 1090 to the control component 1010, and permitting configuration of the interfaces from the user interface (e.g., CLI) process(es) 1060 of the control component 1010. The stored forwarding table(s) 1096 is static until a new one is received from the control component 1010. The interface process(es) 1093 uses the forwarding table(s) 1096 to look up next-hop information. The interface process(es) 1093 also has direct communication with the distributed ASICs 1094. Finally, the chassis process(es) 1095 may communicate directly with the microkernel 1092 and with the distributed ASICs 1094.

In the example router 1000, the example method 500 may be implemented in the packet forwarding component 1090.

Figure 11:
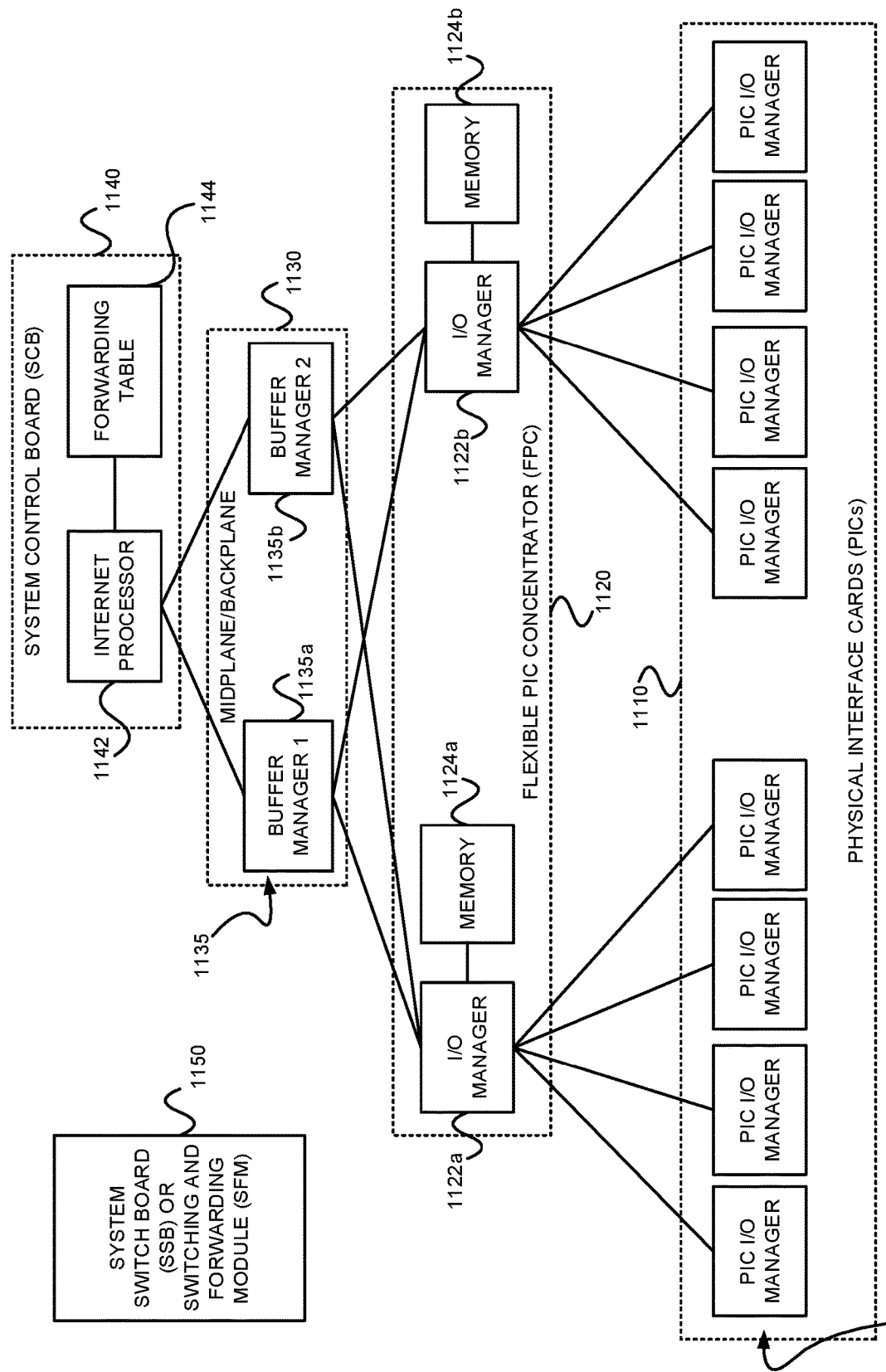
FIG. 11 is an example architecture in which ASICS may be distributed in a packet forwarding component to divide the responsibility of packet forwarding.

Referring back to distributed ASICs 1094 of FIG. 10, FIG. 11 is an example of how the ASICS may be distributed in the packet forwarding component 1090 to divide the responsibility of packet forwarding. As shown in FIG. 11, the ASICs of the packet forwarding component 1090 may be distributed on physical interface cards ("PICs") 1110, flexible PIC concentrators ("FPCs") 1120, a midplane or backplane 1130, and a system control board(s) 1140 (for switching and/or forwarding). Switching fabric is also shown as a system switch board ("SSB"), or a switching and forwarding module ("SFM") 1150. Each of the PICs 1110 includes one or more PIC I/O managers 1115. Each of the FPCs 1120 includes one or more I/O managers 1122, each with an associated memory 1124. The midplane/backplane 1130 includes buffer managers 1135a, 1135b. Finally, the system control board 1140 includes an internet processor 1142 and an instance of the forwarding table 1144 (Recall, e.g., 1096 of FIG. 10).

Still referring to FIG. 11, the PICs 1110 contain the interface ports. Each PIC 1110 may be plugged into an FPC 1120. Each individual PIC 1110 may contain an ASIC that handles media-specific functions, such as framing or encapsulation. Some example PICs 1110 provide SDH/SONET, ATM, Gigabit Ethernet, Fast Ethernet, and/or DS3/E3 interface ports.

An FPC 1120 can contain from one or more PICs 1110, and may carry the signals from the PICs 1110 to the midplane/backplane 1130 as shown in FIG. 11.

The midplane/backplane 1130 holds the line cards. The line cards may connect into the midplane/backplane 1130 when inserted into the example router's chassis from the front. The control component (e.g., routing engine) 1010 may plug into the rear of the midplane/backplane 1130 from the rear of the chassis. The midplane/backplane 1130 may carry electrical (or optical) signals and power to each line card and to the control component 1010.

The system control board 1140 may perform forwarding lookup. It 1140 may also communicate errors to the routing engine. Further, it 1140 may also monitor the condition of the router based on information it receives from sensors. If an abnormal condition is detected, the system control board 1140 may immediately notify the control component 1010.

Figure 12A:
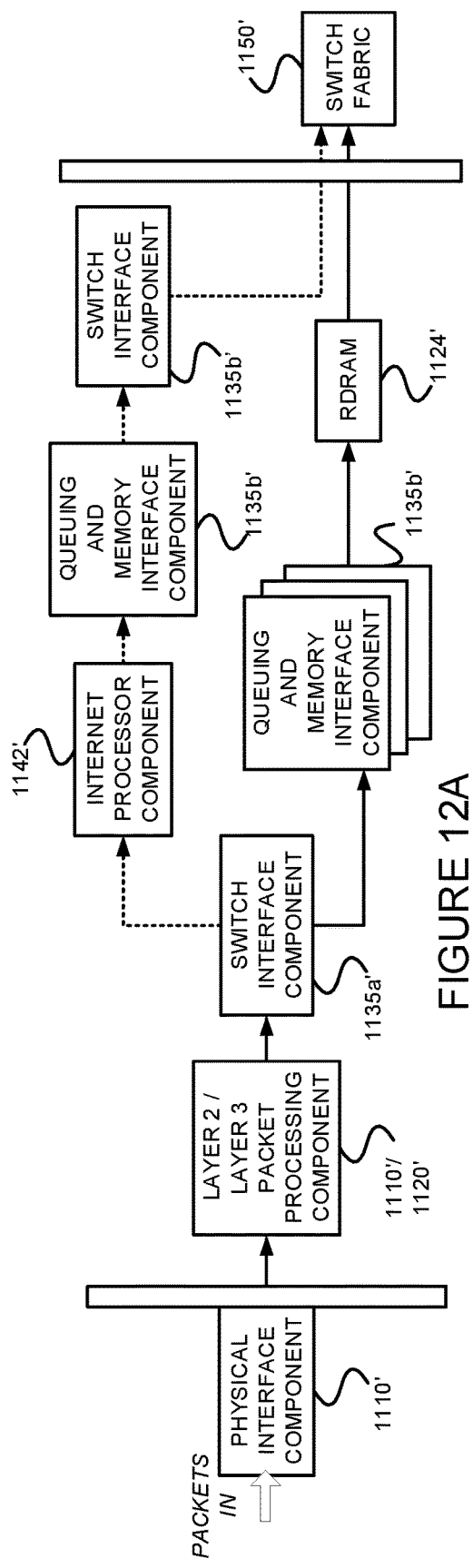
FIGS. 12A and 12B is an example of operations of the example architecture of FIG. 11.
Figure 12B:
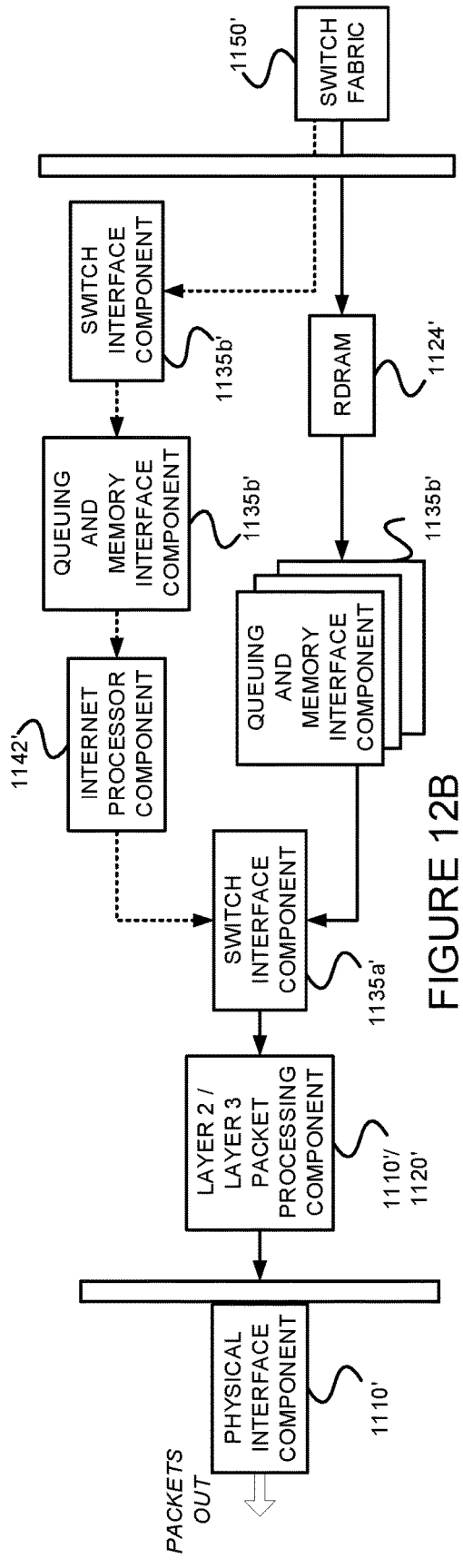

Referring to FIGS. 11, 12A and 12B, in some exemplary routers, each of the PICs 1110,1010' contains at least one I/O manager ASIC 1115 responsible for media-specific tasks, such as encapsulation. The packets pass through these I/O ASICs on their way into and out of the router. The I/O manager ASIC 1115 on the PIC 1110,1010' is responsible for managing the connection to the I/O manager ASIC 1122 on the FPC 1120,1020', managing link-layer framing and creating the bit stream, performing cyclical redundancy checks (CRCs), and detecting link-layer errors and generating alarms, when appropriate. The FPC 1120 includes another I/O manager ASIC 1122. This ASIC 1122 takes the packets from the PICs 1110 and breaks them into (e.g., 74-byte) memory blocks. This FPC I/O manager ASIC 1122 sends the blocks to a first distributed buffer manager (DBM) 1135a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1135a' manages and writes packets to the shared memory 1124 across all FPCs 1120. In parallel, the first DBM ASIC 1135a' also extracts information on the destination of the packet and passes this forwarding-related information to the Internet processor 1142/1042'. The Internet processor 1142/1042' performs the route lookup using the forwarding table 1144 and sends the information over to a second DBM ASIC 1135b'. The Internet processor ASIC 1142/1042' also collects exception packets (i.e., those without a forwarding table entry) and sends them to the control component 1010. The second DBM ASIC 1135b' then takes this information and the 74-byte blocks and forwards them to the I/O manager ASIC 1122 of the egress FPC 1120/1020' (or multiple egress FPCs, in the case of multicast) for reassembly. (Thus, the DBM ASICs 1135a' and 1135b' are responsible for managing the packet memory 1124 distributed across all FPCs 1120/1020', extracting forwarding-related information from packets, and instructing the FPC where to forward packets.)

The I/O manager ASIC 1122 on the egress FPC 1120/1020' may perform some value-added services. In addition to incrementing time to live ("TTL") values and re-encapsulating the packet for handling by the PIC 1110, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1122 on the egress FPC 1120/1020' may be responsible for receiving the blocks from the second DBM ASIC 1135b', incrementing TTL values, queuing a pointer to the packet, if necessary, before applying CoS rules, re-encapsulating the blocks, and sending the encapsulated packets to the PIC I/O manager ASIC 1115.

Figure 13:
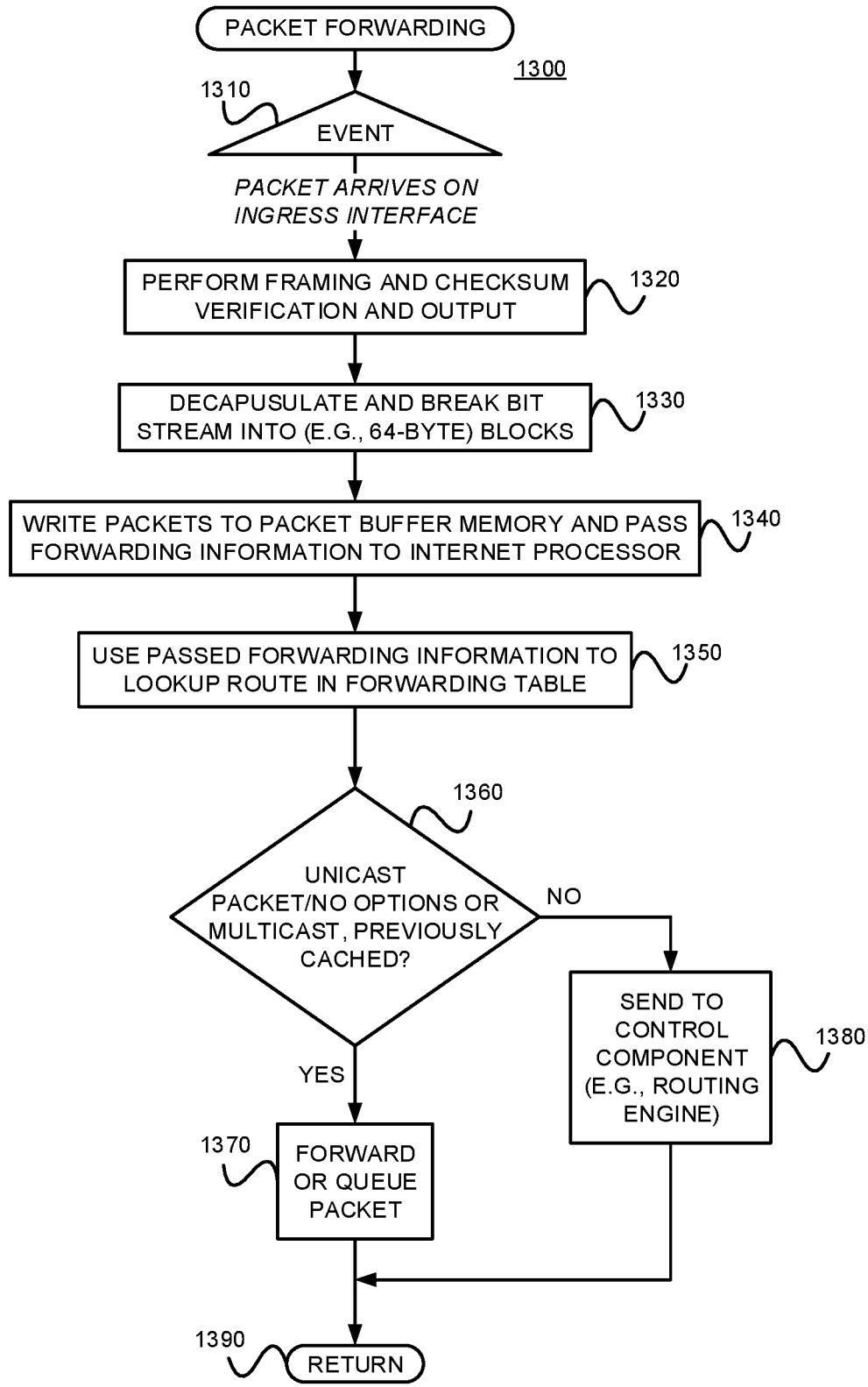
FIG. 13 is a flow diagram of an example method for providing packet forwarding in an example router.

FIG. 13 is a flow diagram of an example method 1300 for providing packet forwarding in the example router. The main acts of the method 1300 are triggered when a packet is received on an ingress (incoming) port or interface. (Event 1310) The types of checksum and frame checks that are required by the type of medium it serves are performed and the packet is output, as a serial bit stream. (Block 1320) The packet is then decapsulated and parsed into (e.g., 64-byte) blocks. (Block 1330) The packets are written to buffer memory and the forwarding information is passed on the Internet processor. (Block 1340) The passed forwarding information is then used to lookup a route in the forwarding table. (Block 1350) Note that the forwarding table can typically handle unicast packets that do not have options (e.g., accounting) set, and multicast packets for which it already has a cached entry. Thus, if it is determined that these conditions are met (YES branch of Decision 1360), the packet forwarding component finds the next hop and egress interface, and the packet is forwarded (or queued for forwarding) to the next hop via the egress interface (Block 1370) before the method 1300 is left (Node 1390) Otherwise, if these conditions are not met (NO branch of Decision 1360), the forwarding information is sent to the control component 1010 for advanced forwarding resolution (Block 1380) before the method 1300 is left (Node 1390).

Referring back to block 1370, the packet may be queued. Actually, as stated earlier with reference to FIG. 11, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1122 may send a request for the packet to the second DBM ASIC 1135b. The DBM ASIC 1135 reads the blocks from shared memory and sends them to the I/O manager ASIC 1122 on the FPC 1120, which then serializes the bits and sends them to the media-specific ASIC of the egress interface. The I/O manager ASIC 1115 on the egress PIC 1110 may apply the physical-layer framing, perform the CRC, and send the bit stream out over the link.

Referring back to block 1380 of FIG. 13, as well as FIG. 11, regarding the transfer of control and exception packets, the system control board 1140 handles nearly all exception packets. For example, the system control board 1140 may pass exception packets to the control component 1010.

Although example embodiments consistent with the present invention may be implemented on the example routers of FIG. 9 or 10, embodiments consistent with the present invention may be implemented on communications network nodes (e.g., routers, switches, etc.) having different architectures. More generally, embodiments consistent with the present invention may be implemented on an example system 1400 as illustrated on FIG. 14.

Figure 14:
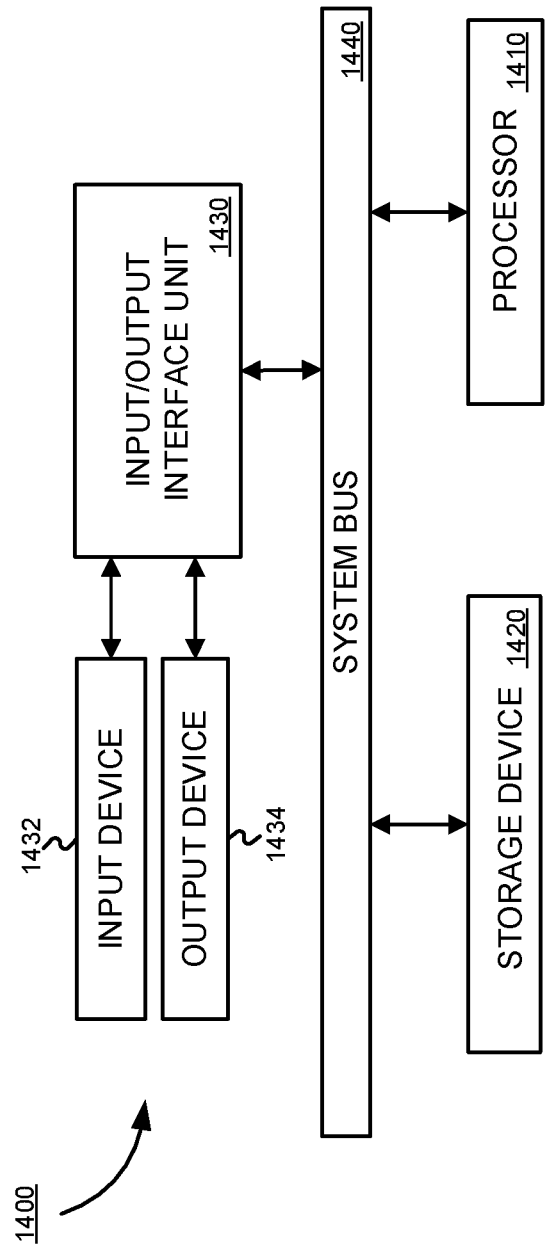
FIG. 14 is a block diagram of an exemplary machine 1400 that may perform one or more of the processes described, and/or store information used and/or generated by such processes.

FIG. 14 is a block diagram of an exemplary machine 1400 that may perform one or more of the processes described, and/or store information used and/or generated by such processes. The exemplary machine 1400 includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1420 and/or may be received from an external source via one or more input interface units 1430. The machine executable instructions may be stored as various software modules, each module performing one or more operations. Functional software modules are examples of components of the invention.

In some embodiments consistent with the present invention, the processors 1410 may be one or more microprocessors and/or ASICs. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 Refinements, Alternative and Extensions

Version 3 of L2TP (L2TPv3) is defined in RFC 3931 (incorporated herein by reference). It does not use a Session ID field in the L2TP header, and the Tunnel ID field is known by "Control Connection ID". The example method described above is not affected by this new header format (because the example new AVP and message type can be seamlessly inserted into this new header based on the control message type).

What is claimed is:
1. A computer-implemented method for use by a node having at least one forwarding component and a control component controlling each of the at least one forwarding component, the method comprising:

a) establishing a dedicated channel for tunnel hello keepalive messaging between the node and a peer node, wherein a layer 2 tunnel protocol (L2TP) tunnel is established between the node and the peer node such that the node serves as a local tunnel endpoint and the peer node serves as a peer tunnel endpoint, wherein the dedicated channel operates within the L2TP tunnel, wherein keepalive messages on the dedicated channel are to be processed by one of the at least one forwarding component of the node without needing the control component of the node, and wherein the act of establishing a dedicated channel operating within a L2TP tunnel uses a message that specifies (A) a hello dedicated control channel attribute type, and (B) an attribute value indicating that the hello channel dedicated control channel is supported;

b) exchanging with the peer tunnel endpoint, by the local tunnel endpoint, hello request messages and hello reply messages over the dedicated channel operating within the L2TP tunnel;

c) determining, by the one of the at least one forwarding component of the node without needing the control component of the node, and using the exchanged hello request messages and a hello reply messages, whether a keepalive timeout condition for the L2TP tunnel has been met; and d) responsive to determining that a keepalive timeout condition for the L2TP tunnel has been met,
 i) informing the control component of the node of the keepalive timeout, and
 ii) initiating teardown of the L2TP tunnel using the control component of the node, and
otherwise, responsive to failing to determine that a keepalive timeout condition for the L2TP has been met, continuing the exchange of hello request messages and hello reply messages between the local tunnel endpoint and the peer tunnel endpoint.

2. The computer-implemented method of claim 1 wherein the node is a L2TP access concentrator (LAC) and the peer node is a L2TP network server (LNS).

3. The computer-implemented method of claim 1 wherein the node is a L2TP network server (LNS) and the peer node is a L2TP access concentrator (LAC).

4. The computer-implemented method of claim 1, wherein the message is a Start Control Connection ReQuest (SCCRQ) message including a special attribute value pair (AVP) that specifies (A) the hello dedicated control channel attribute type, and (B) the attribute value indicating that the hello channel dedicated control channel is supported, and wherein the act of establishing a dedicated channel for hello keepalive messaging between the local tunnel endpoint and the peer tunnel endpoint further includes
 1) sending the generated SCCRQ message to the peer tunnel endpoint, and
 2) receiving a Start Control Connection RePly (SCCRP) message including the special attribute value pair from the peer tunnel endpoint.

5. The computer-implemented method of claim 4 wherein the attribute value indicating that the hello dedicated control channel is supported further specifies whether or not sequence numbers are to be used in keepalive control messages carried over the dedicated channel.

6. The computer-implemented method of claim 1, wherein the message is a Start Control Connection ReQuest (SCCRQ) message including a special attribute value pair (AVP) that specifies (A) the hello dedicated control channel attribute type, and (B) the attribute value indicating that the hello channel dedicated control channel is supported, and wherein the act of establishing a dedicated channel operating within a L2TP tunnel further includes
 1) sending the generated SCCRQ message to the peer tunnel endpoint, and
 2) receiving a Start Control Connection RePly (SCCRP) message including the special attribute value pair from the peer tunnel endpoint,
wherein keepalive messages on the dedicated channel are to be processed by one of the at least one forwarding component of the node without needing the control component of the node.

7. The computer-implemented method of claim 6 wherein the attribute value indicating that the hello channel dedicated control channel is supported further specifies whether or not sequence numbers are to be used in keepalive control messages carried over the dedicated channel.

8. A node comprising:
a) at least one forwarding component;
b) a control component controlling each of the at least one forwarding component;
c) at least one processor; and
d) a storage device storing processor executable instructions which, when executed by the at least one processor, cause the node to
 1) establish a dedicated channel for hello keepalive messaging between the node, which serves as a local tunnel endpoint of a layer 2 tunnel protocol (L2TP) tunnel which is established between the local tunnel endpoint and a peer tunnel endpoint, wherein the dedicated channel operates within the L2TP tunnel, wherein keepalive messages on the dedicated channel are to be processed by one of the at least one forwarding component of the node without needing the control component of the node, and wherein the act of establishing a dedicated channel uses a message that specifies (A) a hello dedicated control channel attribute type, and (B) an attribute value indicating that the hello channel dedicated control channel is supported,
 2) exchange with the peer tunnel endpoint, hello request messages and hello reply messages over the dedicated channel,
 3) determine, by the one of the at least one forwarding component of the node without needing the control component of the node, and using the exchanged hello request messages and a hello reply messages, whether a keepalive timeout condition has been met, and
 4) responsive to determining that a keepalive timeout condition has been met,
  informing the control component of the keepalive timeout, wherein the control component initiates a teardown of the L2TP tunnel, and
 otherwise, responsive to failing to determine that a keepalive timeout condition has been met,
  continuing the exchange of hello request messages and hello reply messages between the local tunnel endpoint and the peer tunnel endpoint.

9. The node of claim 8 wherein the node is a L2TP access concentrator (LAC) and the peer node is a L2TP network server (LNS).

10. The node of claim 8 wherein the node is a L2TP network server (LNS) and the peer node is a L2TP access concentrator (LAC).

11. The node of claim 8, wherein the message is a Start Control Connection ReQuest (SCCRQ) message including a special attribute value pair (AVP) that specifies (A) the hello dedicated control channel attribute type, and (B) the attribute value indicating that the hello channel dedicated control channel is supported, and wherein the node establishes a dedicated channel for hello keepalive messaging between the local tunnel endpoint and the peer tunnel endpoint by further A) sending the generated SCCRQ message to the peer tunnel endpoint, and B) receiving a Start Control Connection RePly (SCCRP) message including the special attribute value pair from the peer tunnel endpoint.

12. The node of claim 11 wherein the attribute value indicating that the hello channel dedicated control channel is supported further specifies whether or not sequence numbers are to be used in keepalive control messages carried over the dedicated channel.

13. The node of claim 8 wherein the message is a Start Control Connection ReQuest (SCCRQ) message including a special attribute value pair (AVP) that specifies (A) the hello dedicated control channel attribute type, and (B) the attribute value indicating that the hello channel dedicated control channel is supported, and wherein the dedicated channel is established by further 1) sending the generated SCCRQ message to the peer tunnel endpoint, and 2) receiving a Start Control Connection RePly (SCCRP) message including the special attribute value pair from the peer tunnel endpoint, wherein a layer 2 tunnel protocol (L2TP) tunnel is established between the local tunnel endpoint and the peer tunnel endpoint, and wherein keepalive messages on the dedicated channel are to be processed by one of the at least one forwarding component of the node without needing the control component of the node.

14. The node of claim 13 wherein the attribute value indicating that the hello channel dedicated control channel is supported further specifies whether or not sequence numbers are to be used in keepalive control messages carried over the dedicated channel.

15. A non-transitory computer-readable medium storing processor executable instructions which, when executed by at least one processor of a node including at least one forwarding component and a control component controlling each of the at least one forwarding component, cause the node to:

a) establish a dedicated channel for tunnel hello keepalive messaging between the node and a peer node, wherein a layer 2 tunnel protocol (L2TP) tunnel is established between the node and the peer node such that the node serves as a local tunnel endpoint and the peer node serves as a peer tunnel endpoint, wherein the dedicated channel operates within the L2TP tunnel, wherein keepalive messages on the dedicated channel are to be processed by one of the at least one forwarding component of the node without needing the control component of the node, and wherein the act of establishing a dedicated channel uses a message that specifies (A) a hello dedicated control channel attribute type, and (B) an attribute value indicating that the hello channel dedicated control channel is supported;

b) exchange with the peer tunnel endpoint, hello request messages and hello reply messages over the dedicated channel operating within the L2TP tunnel;

c) determine, by the one of the at least one forwarding component of the node without needing the control component of the node, and using the exchanged hello request messages and a hello reply messages, whether a keepalive timeout condition for the L2TP tunnel has been met; and d) responsive to determining that a keepalive timeout condition for the L2TP tunnel has been met,
informing the control component of the keepalive timeout, wherein the control component initiates a teardown of the L2TP tunnel, and otherwise, responsive to failing to determine that a keepalive timeout condition for the L2TP tunnel has been met,
continuing the exchange of hello request messages and hello reply messages between the local tunnel endpoint and the peer tunnel endpoint.

16. The non-transitory computer-readable medium of claim 15 wherein the node is a L2TP access concentrator (LAC) and the peer node is a L2TP network server (LNS).

17. The non-transitory computer-readable medium claim 15 wherein the node is a L2TP network server (LNS) and the peer node is a L2TP access concentrator (LAC).

18. The non-transitory computer-readable medium of claim 15, wherein the message is a Start Control Connection ReQuest (SCCRQ) message including a special attribute value pair (AVP) that specifies (A) the hello dedicated control channel attribute type, and (B) the attribute value indicating that the hello channel dedicated control channel is supported, and wherein program instructions cause the node to establish a dedicated channel for hello keepalive messaging between the local tunnel endpoint and the peer tunnel endpoint by further A) sending the generated SCCRQ message to the peer tunnel endpoint, and B) receiving a Start Control Connection RePly (SCCRP) message including the special attribute value pair from the peer tunnel endpoint.

19. The non-transitory computer-readable medium of claim 18 wherein the attribute value indicating that the hello dedicated control channel is supported further specifies whether or not sequence numbers are to be used in keepalive control messages carried over the dedicated channel.

* * * * *